United States Patent
Meiri et al.

(10) Patent No.: US 11,281,407 B1
(45) Date of Patent: Mar. 22, 2022

(54) VERIFIED WRITE COMMAND IN ACTIVE-ACTIVE REPLICATION

(71) Applicant: EMC IP Holding Company LLC, Hopkinton, MA (US)

(72) Inventors: David Meiri, Somerville, MA (US); Xiangping Chen, Sherborn, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/029,406

(22) Filed: Sep. 23, 2020

(51) Int. Cl.
*G06F 3/06* (2006.01)
*G06F 11/07* (2006.01)

(52) U.S. Cl.
CPC ............ *G06F 3/0659* (2013.01); *G06F 3/067* (2013.01); *G06F 3/0619* (2013.01); *G06F 3/0629* (2013.01); *G06F 11/0772* (2013.01)

(58) Field of Classification Search
None
See application file for complete search history.

(56) References Cited

U.S. PATENT DOCUMENTS

| | | | |
|---|---|---|---|
| 5,742,792 A * | 4/1998 | Yanai | G06F 11/2074 711/162 |
| 6,496,908 B1 | 12/2002 | Kamvysselis et al. | |
| 6,553,464 B1 | 4/2003 | Kamvysselis et al. | |
| 6,640,280 B1 | 10/2003 | Kamvysselis et al. | |
| 6,862,632 B1 | 3/2005 | Halstead et al. | |
| 6,883,018 B1 | 4/2005 | Meiri et al. | |
| 6,886,164 B2 | 4/2005 | Meiri | |
| 6,898,685 B2 | 5/2005 | Meiri et al. | |
| 6,910,075 B2 | 6/2005 | Marshak et al. | |
| 6,938,122 B2 | 8/2005 | Meiri et al. | |
| 6,944,726 B2 | 9/2005 | Yoder et al. | |
| 6,968,369 B2 | 11/2005 | Veprinsky et al. | |
| 6,976,139 B2 | 12/2005 | Halstead et al. | |
| 7,000,086 B2 | 2/2006 | Meiri et al. | |
| 7,024,525 B2 | 4/2006 | Yoder et al. | |
| 7,032,228 B1 | 4/2006 | McGillis et al. | |
| 7,051,176 B2 | 5/2006 | Meiri et al. | |

(Continued)

OTHER PUBLICATIONS

U.S. Appl. No. 15/001,789, filed Jan. 20, 2016, Meiri et al.

(Continued)

*Primary Examiner* — Edward J Dudek, Jr.
*Assistant Examiner* — Ralph A Verderamo, III
(74) *Attorney, Agent, or Firm* — Daly, Crowley, Mofford & Durkee, LLP

(57) ABSTRACT

A method is provided, comprising: receiving, at a first storage array, a first request to perform an atomic write operation at a specified address in a volume; placing a read-write lock on a first instance of the volume, and executing the atomic write operation on the first instance of the volume; transmitting, to a second storage array, a second request to perform the atomic write operation on a second instance of the volume; and detecting whether an error condition is present that is associated with the second request; when the error condition is present, comparing a first data item that is stored at the specified address in the first instance of the volume with a second data item that is stored at the specified address in the second instance of the volume, and, when the first data item matches the second data item, transmitting an acknowledgment.

20 Claims, 9 Drawing Sheets

(56) References Cited

U.S. PATENT DOCUMENTS

| | | |
|---|---|---|
| 7,054,883 B2 | 5/2006 | Meiri et al. |
| 7,113,945 B1 | 9/2006 | Moreshet et al. |
| 7,114,033 B2 | 9/2006 | Longinov et al. |
| 7,174,423 B2 | 2/2007 | Meiri et al. |
| 7,197,616 B2 | 3/2007 | Meiri et al. |
| 7,228,456 B2 | 6/2007 | Lecrone et al. |
| 7,240,116 B2 | 7/2007 | Marshak et al. |
| 7,292,969 B1 | 11/2007 | Aharoni et al. |
| 7,376,651 B2 | 5/2008 | Moreshet et al. |
| 7,380,082 B2 | 5/2008 | Meiri et al. |
| 7,383,385 B2 | 6/2008 | Meiri et al. |
| 7,383,408 B2 | 6/2008 | Meiri et al. |
| 7,386,668 B2 | 6/2008 | Longinov et al. |
| 7,392,360 B1 | 6/2008 | Aharoni et al. |
| 7,409,470 B2 | 8/2008 | Halstead et al. |
| 7,430,589 B2 | 9/2008 | Veprinsky et al. |
| 7,577,957 B1 | 8/2009 | Kamvysselis et al. |
| 7,613,890 B1 | 11/2009 | Meiri |
| 7,617,372 B1 | 11/2009 | Bjornsson et al. |
| 7,702,871 B1 | 4/2010 | Arnon et al. |
| 7,870,195 B1 | 1/2011 | Meiri |
| 8,046,545 B2 | 10/2011 | Meiri et al. |
| 8,078,813 B2 | 12/2011 | LeCrone et al. |
| 8,332,687 B1 | 12/2012 | Natanzon et al. |
| 8,335,771 B1 | 12/2012 | Natanzon et al. |
| 8,335,899 B1 | 12/2012 | Meiri et al. |
| 8,468,180 B1 | 6/2013 | Meiri et al. |
| 8,578,204 B1 | 11/2013 | Ortenberg et al. |
| 8,600,943 B1 | 12/2013 | Fitzgerald et al. |
| 8,677,087 B2 | 3/2014 | Meiri et al. |
| 8,694,700 B1 | 4/2014 | Natanzon et al. |
| 8,706,959 B1 | 4/2014 | Arnon et al. |
| 8,719,497 B1 | 5/2014 | Don et al. |
| 8,732,124 B1 | 5/2014 | Arnon et al. |
| 8,782,357 B2 | 7/2014 | Halstead et al. |
| 8,812,595 B2 | 8/2014 | Meiri et al. |
| 8,825,964 B1 | 9/2014 | Sopka et al. |
| 8,838,849 B1 | 9/2014 | Meiri et al. |
| 8,862,546 B1 | 10/2014 | Natanzon et al. |
| 8,914,596 B2 | 12/2014 | Lecrone et al. |
| 8,966,211 B1 | 2/2015 | Arnon et al. |
| 8,977,826 B1 | 3/2015 | Meiri et al. |
| 9,002,904 B1 | 4/2015 | Meiri et al. |
| 9,009,437 B1 | 4/2015 | Bjornsson et al. |
| 9,026,492 B1 | 5/2015 | Shorey et al. |
| 9,026,696 B1 | 5/2015 | Natanzon et al. |
| 9,037,816 B1 | 5/2015 | Halstead et al. |
| 9,037,822 B1 | 5/2015 | Meiri et al. |
| 9,100,343 B1 | 8/2015 | Riordan et al. |
| 9,110,693 B1 | 8/2015 | Meiri et al. |
| 9,304,889 B1 | 4/2016 | Chen et al. |
| 9,323,750 B2 | 4/2016 | Natanzon et al. |
| 9,342,465 B1 | 5/2016 | Meiri |
| 9,378,106 B1 | 6/2016 | Ben-Moshe et al. |
| 9,396,243 B1 | 7/2016 | Halevi et al. |
| 9,418,131 B1 | 8/2016 | Halevi et al. |
| 9,483,355 B1 | 11/2016 | Meiri et al. |
| 9,524,220 B1 | 12/2016 | Veprinsky et al. |
| 9,558,083 B2 | 1/2017 | LeCrone et al. |
| 9,606,739 B1 | 3/2017 | LeCrone et al. |
| 9,606,870 B1 | 3/2017 | Meiri et al. |
| 9,753,663 B1 | 9/2017 | LeCrone et al. |
| 9,959,063 B1 | 5/2018 | Meiri et al. |
| 9,959,073 B1 | 5/2018 | Meiri |
| 10,007,466 B1 | 6/2018 | Meiri et al. |
| 10,025,843 B1 | 7/2018 | Meiri et al. |
| 10,055,161 B1 | 8/2018 | Meiri et al. |
| 10,095,428 B1 | 10/2018 | Meiri et al. |
| 10,152,527 B1 | 12/2018 | Meiri et al. |
| 10,238,487 B2 | 3/2019 | Alon et al. |
| 10,261,853 B1 | 4/2019 | Chen et al. |
| 10,310,951 B1 | 6/2019 | Chen et al. |
| 10,324,635 B1 | 6/2019 | Meiri |
| 10,324,640 B1 | 6/2019 | Chen et al. |
| 10,324,806 B1 | 6/2019 | Kucherov et al. |
| 10,331,350 B1 | 6/2019 | Kucherov et al. |
| 10,338,851 B1 | 7/2019 | Kronrod et al. |
| 10,359,965 B1 | 7/2019 | Stronge et al. |
| 10,374,792 B1 | 8/2019 | Meiri et al. |
| 10,394,485 B1 | 8/2019 | Chen et al. |
| 10,409,520 B1 | 9/2019 | Meiri et al. |
| 10,437,855 B1 | 10/2019 | Stronge et al. |
| 10,459,632 B1 | 10/2019 | Chen et al. |
| 10,459,883 B1 | 10/2019 | Meiri et al. |
| 10,466,925 B1 | 11/2019 | Blanco et al. |
| 10,496,324 B2 | 12/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,503,609 B1 | 12/2019 | Stronge et al. |
| 10,534,547 B2 | 1/2020 | Meiri et al. |
| 10,565,058 B1 | 2/2020 | Meiri et al. |
| 10,613,793 B1 | 4/2020 | Hu et al. |
| 11,089,105 B1 * | 8/2021 | Karumbunathan ..... G06F 3/067 |
| 2008/0034172 A1 * | 2/2008 | Duffy ..................... G06F 9/467 |
| | | 711/156 |
| 2016/0110378 A1 * | 4/2016 | Mu ....................... G06F 11/006 |
| | | 707/634 |
| 2018/0260125 A1 * | 9/2018 | Botes .................... G06F 16/275 |
| 2019/0243703 A1 * | 8/2019 | Rooney ............... G06F 11/2082 |

OTHER PUBLICATIONS

U.S. Appl. No. 15/085,188, filed Mar. 30, 2016, Meiri et al.
U.S. Appl. No. 15/499,226, filed Apr. 27, 2017, Meiri et al.
U.S. Appl. No. 15/499,199, filed Apr. 27, 2017, Stronge et al.
U.S. Appl. No. 15/797,329, filed Oct. 30, 2017, Parasnis et al.
U.S. Appl. No. 15/971,153, filed May 4, 2018, Meiri et al.
U.S. Appl. No. 15/971,310, filed May 4, 2018, Kucherov et al.
U.S. Appl. No. 15/971,325, filed May 4, 2018, Kucherov et al.
U.S. Appl. No. 15/971,445, filed May 4, 2018, Kucherov et al.
U.S. Appl. No. 16/050,247, filed Jul. 31, 2018, Schneider et al.
U.S. Appl. No. 16/177,782, filed Nov. 1, 2018, Hu et al.
U.S. Appl. No. 16/264,825, filed Feb. 1, 2019, Chen et al.
U.S. Appl. No. 16/263,414, filed Jan. 31, 2019, Meiri et al.
U.S. Appl. No. 16/395,595, filed Apr. 26, 2019, Meiri et al.
U.S. Appl. No. 16/396,880, filed Apr. 29, 2019, Meiri et al.
U.S. Appl. No. 16/398,595, filed Apr. 30, 2019, Kucherov et al.
U.S. Appl. No. 16/521,728, filed Jul. 25, 2019, Meiri et al.
U.S. Appl. No. 16/521,730, filed Jul. 25, 2019, Meiri et al.
U.S. Appl. No. 16/516,670, filed Jul. 19, 2019, Kucherov et al.
U.S. Appl. No. 16/516,677, filed Jul. 19, 2019, Meiri et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/808,943, filed Mar. 4, 2020, Parasnis et al.
U.S. Appl. No. 16/864,272, filed May 1, 2020, Chen et al.
U.S. Appl. No. 17/029,508, filed Sep. 23, 2020, Chen et al.

* cited by examiner

VERIFIED WRITE COMMAND IN ACTIVE-ACTIVE REPLICATION

BACKGROUND

A distributed storage system may include a plurality of storage devices (e.g., storage device arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in an active-active storage cluster having first a storage array and a second storage array, the method comprising: receiving, at the first storage array, a first request to perform an atomic write operation at a specified address in a volume, the first request being received from a host device; placing a read-write lock on a first instance of the volume that is stored at the first storage array, and executing the atomic write operation on the first instance of the volume; transmitting, to the second storage array, a second request to perform the atomic write operation on a second instance of the volume that is stored at the second storage array; and detecting whether an error condition is present that is associated with the second request; when the error condition is present, comparing a first data item that is stored at the specified address in the first instance of the volume with a second data item that is stored at the specified address in the second instance of the volume, and, when the first data item matches the second data item, transmitting an acknowledgment to the host device indicating that the first request has been completed successfully.

According to aspects of the disclosure, a storage system is provided, comprising: one or more storage devices, and at least one processor configured to perform the operations of: receiving a first request to perform an atomic write operation at a specified address in a volume, the first request being received from a host device; placing a read-write lock on a first instance of the volume that is stored in the one or more storage devices, and executing the atomic write operation on the first instance of the volume; transmitting, to a peer storage system, a second request to perform the atomic write operation on a second instance of the volume that is stored at the peer storage system; and detecting whether an error condition is present that is associated with the second request; when the error condition is present, comparing a first data item that is stored at the specified address in the first instance of the volume with a second data item that is stored at the specified address in the second instance of the volume, and, when the first data item matches the second data item, transmitting an acknowledgment to the host device indicating that the first request has been completed successfully.

According aspects of the disclosure, a method is provided for use in an active-active storage cluster having first a storage array and a second storage array, the method comprising: receiving, at the first storage array, a first request to perform an atomic write operation at a specified address in a volume, the first request being received from a host device; placing a read-write lock on a first instance of the volume that is stored at the first storage array; transmitting, to the second storage array, a second request to perform the atomic write operation on a second instance of the volume that is stored at the second storage array; detecting whether an error condition is present that is associated with the second request; and when the error condition is present, comparing a first data item that is stored at the specified address in the first instance of the volume with a second data item that is stored at the specified address in the second instance of the volume, and, when the first data item does not match the second data item, copying the second data item to the specified address in the first instance of the volume, and transmitting an acknowledgment to the host device indicating that the first request has been completed successfully.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Figure 1A:
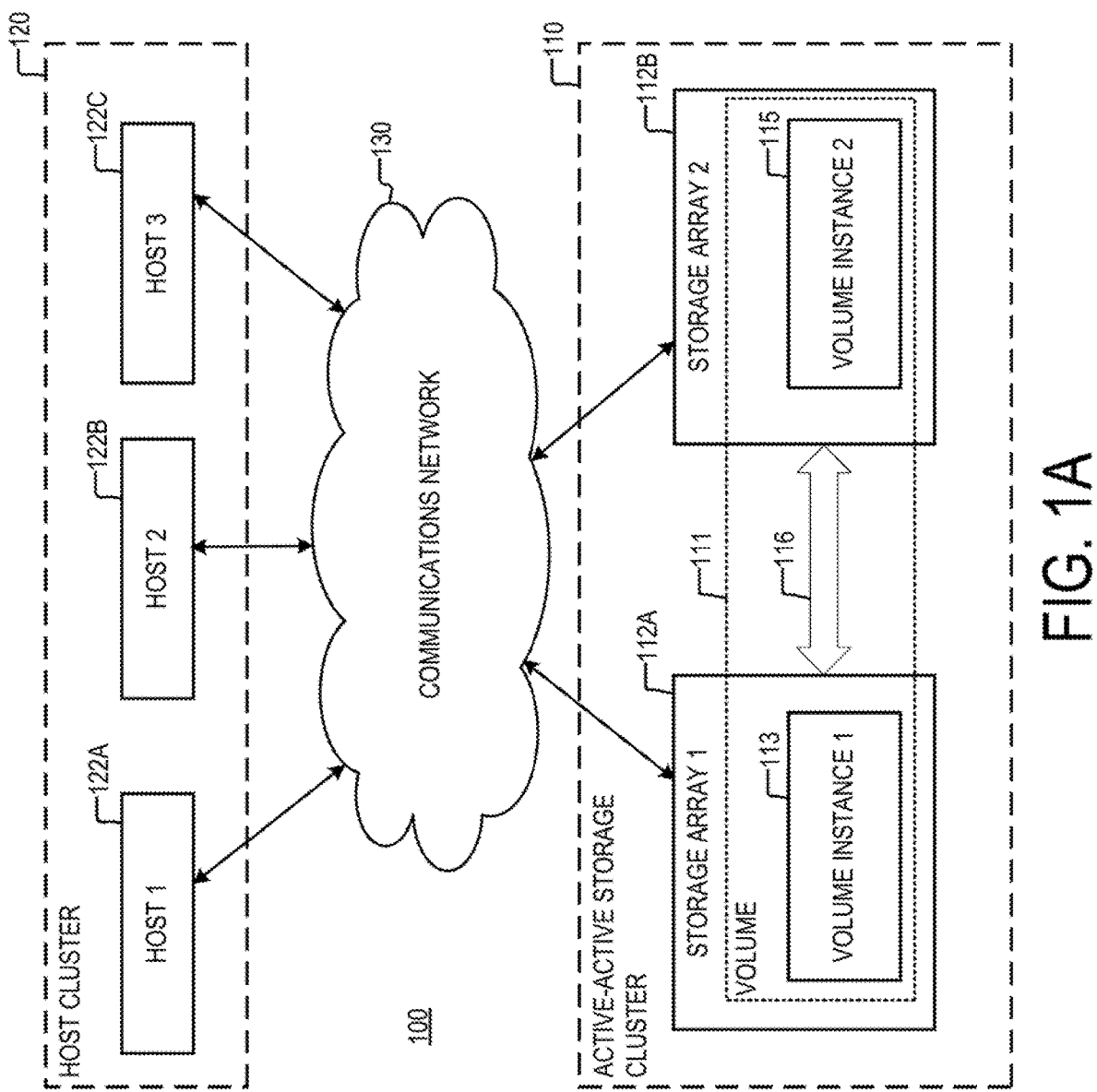
FIG. 1A is a diagram of an example of a system, according to aspects of the disclosure.

FIG. 1A is a diagram of an example of a system 100, according to aspects of the disclosure. The system 100 may include a storage cluster 110 that is coupled to a host cluster 120 via a communications network 130.

The storage cluster 110 may include a first storage array 112A and a second storage array 112B. The first storage array 112A and the second storage array 112B may be configured to maintain a storage volume 111. The first storage array 112A may store a first instance 113 of the volume 111, and the second storage array 112B may store a second instance 115 of the volume 111. The first storage array 112A and the second storage array 112B may be coupled to one another via a communications network 116 and configured to operate in active-active configuration. In this configuration, data stored in one of the storage arrays 112A and 112B is replicated to the other one by utilizing a replication process that is carried over the communications network 116. Each of the storage arrays 112A and 112B may therefore operate as a production storage array relative to the other, which operates as a backup or recovery storage array.

Host devices in the host cluster 120 may write to the volume 111 by interacting with either one of the first storage array 112A and the second storage array 112B. When a host device writes data to the volume 111 via the first storage array 112A, the first storage array 112A may store the data in the first instance 113 of the volume 111, and it may also interact with the second storage array 112B to store the data in the second instance 115 of volume 111. Similarly, when a host device writes data to the volume 111 via the second storage array 112B, the second storage array 112B may store the data in the second instance 115 of the volume 111, and it may also interact with the first storage array 112A to store the data in the first instance 113 of volume 111. The first instance 113 and the second instance 115 of volume 111 must be maintained in a consistent state.

The host cluster 120 may include one or more host devices 122. According to the present example, the host cluster 120 includes a host device 122A, a host device 122B, and a host device 122B. Any of the host devices 122 may include a desktop computer, a smartphone, a server, a file server, a database frontend, a website frontend, and/or any other suitable type of storage device. Additionally or alternatively, in some implementations, any of the host devices 122 may include a computing device, such as the computing device 500, which is discussed further below with respect to FIG. 5.

The communications network 130 may include one or more of the Internet, a wide area network (WAN), a local area network (LAN), an InfiniB and network, and/or any other suitable type of network. The communications network 116 may include one or more the Internet, a wide area network (WAN), a local area network (LAN), an InfiniBand network, and/or any other suitable type of network. The communications network 116 may or may not be part of the communications network 130. For example, in some implementations, the communications network 116 may be an internal network that is dedicated to communications between the first storage array 112A and the second storage array 112B.

Figure 1B:
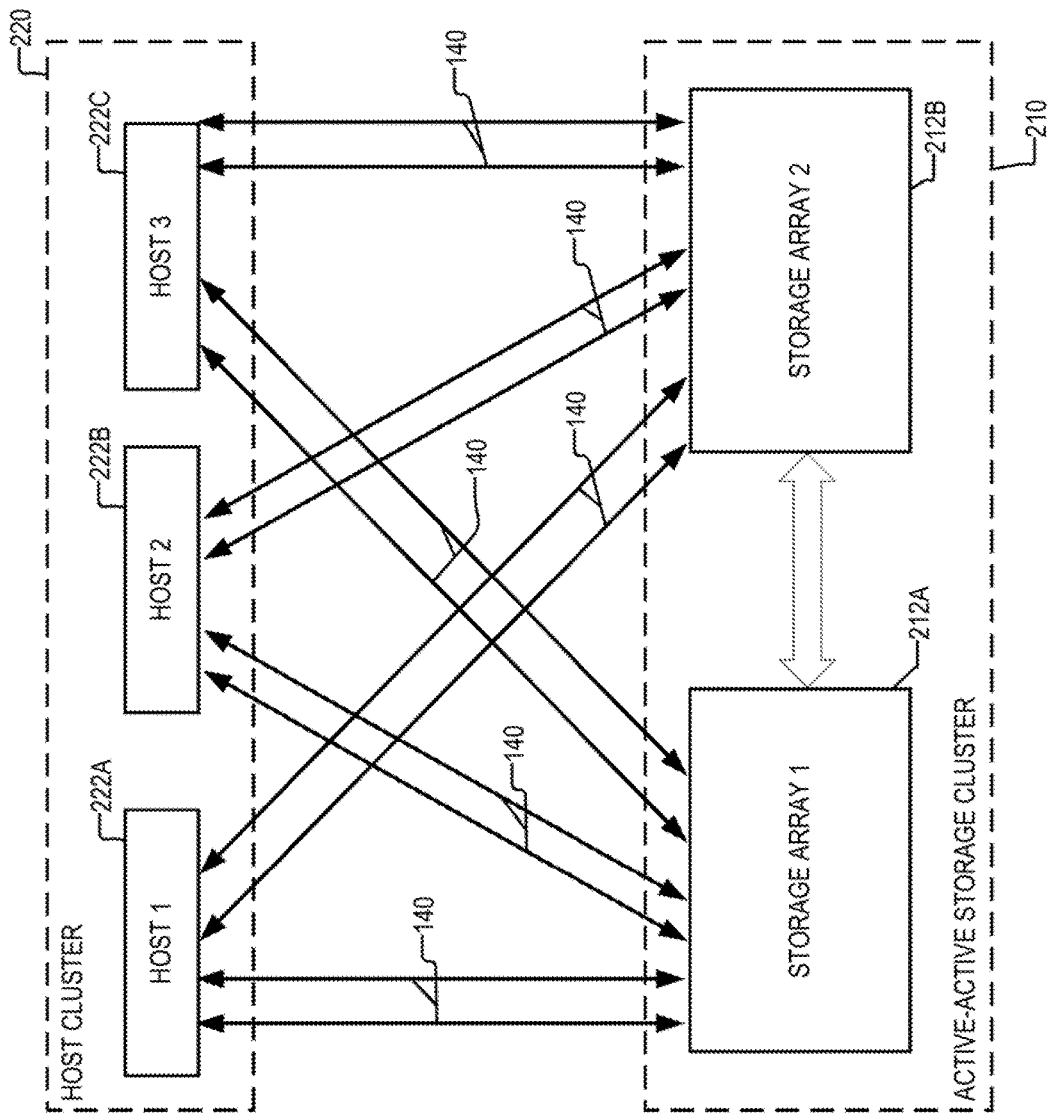
FIG. 1B is a diagram of an example a system, according to aspects of the disclosure.

FIG. 1B is a diagram illustrating aspects of the operation of the system 100. As illustrated, each of the host devices 122 may be connected to one or both of the first storage array 112A and the second storage array 112B. Each of the host devices 122 may be connected to any of the storage arrays 112A and 112B via one or more communication paths 140 that are provided by the communications network. The communications paths 140 may be used to balance the load on the storage cluster 110 and provide redundant means for reading and writing data to the volume 111. By way of example, in some implementations, the host cluster 120 may be a database frontend, and the volume 111 may be the storage location where the database is being stored. In such a scenario, the latency at which read and write requests are completed by the storage cluster 110 may be critical with respect to the overall operation of the storage cluster 110. For this reason, each of the host devices may be coupled to any of the storage arrays 112A and 112B via more than one communications path or coupled to both of the storage arrays 112A and 112B.

Figure 2B:
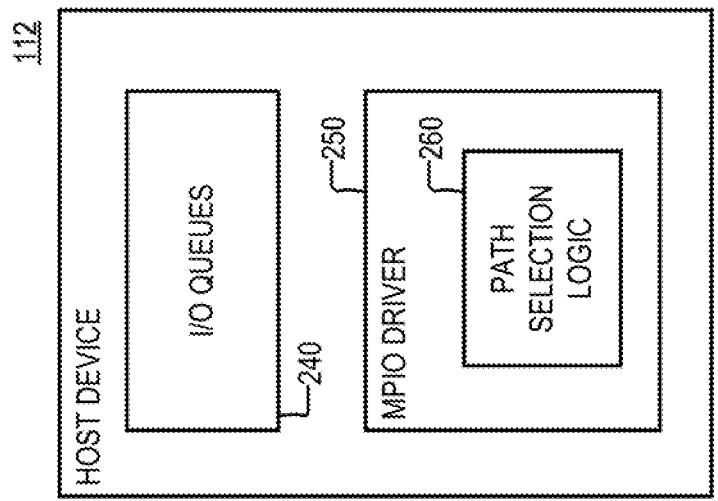
FIG. 2B is a diagram of an example of a host device, according to aspects of the disclosure.
Figure 2A:
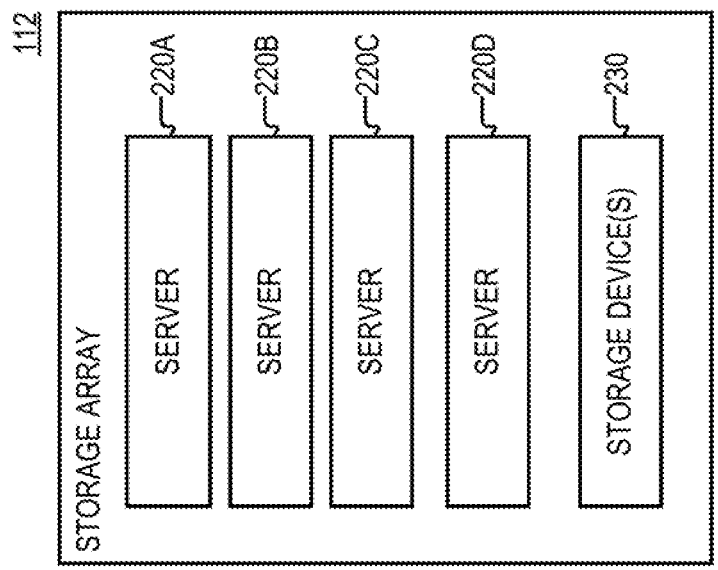
FIG. 2A is a diagram of an example of a storage array, according to aspects of the disclosure.

FIG. 2A is a diagram of an example of storage array 112, according to aspects of the disclosure. As the numbering suggests, the storage array 112 may be the same or similar to any of the first storage array 112A and the second storage array 112B.

As illustrated, the storage array 112 may include one or more servers 220 and one or more storage devices 230. Any of the servers 220 may be implemented by using any suitable type of computing device, such as the computing device 500, which is discussed further below with respect to FIG. 5. For example, any of the servers 220 may include a storage server that is configured to service incoming I/O requests. As another example, each of the servers may include a management system that is configured to control various aspects of the operation of the storage array 112, such as data replication, data backup, data deduplication, garbage collection, etc. As used throughout the disclosure, the phrase "perform a task by a storage array" shall refer to the task being performed by one or more servers (or other computing devices) that are part of the storage array and/or one or more processes that are executed on any of the servers (or other computing devices) that are part of the storage array.

The storage devices 230 may include one or more rotating magnetic storage devices, one or more rotating optical storage devices, and/or one or more solid state drives (SSDs). Additionally or alternatively, the storage devices 230 may include one or more hard disk drives (HDD), one or more flash drives, optical disks, as well as one or more other types of data storage devices. Additionally or alternatively, the storage devices 230 may include a redundant array of inexpensive disks (RAID) array, an optical storage array, or any other type of array of storage devices 230.

FIG. 2B is a diagram of an example of a host device 122, according to aspects of the disclosure. As the numbering suggests, the host device 122 may be the same or similar to any of the host devices 122A-C, which are discussed above with respect to FIG. 1A. As noted above, the host device 122 may be implemented with any suitable type of computing device, such as the computing device 500, which is discussed further below with respect to FIG. 5. In operation, the host device may be configured to provide one or more I/O queues 240 and an MPIO driver 250.

The MPIO driver 250 may be part of a multi-path layer of the host cluster 120. The multi-path layer provides automated path selection functionality using a path selection logic 260, which is part of the MPIO driver 250. The MPIO driver 250 may comprise, for example, PowerPath drivers from Dell EMC, and/or other types of MPIO drivers that are arranged to discover available communications paths between the host device 122 and corresponding storage arrays (e.g., the storage arrays 112A and 112B). The MPIO driver 250 may be configured to select I/O operations from any of the I/O queues 240 for delivery to the storage arrays 112A and 112B over the communications network 130. The sources of the IO operations stored in the set of I/O queues 240 may include respective processes of one or more applications executing on the host device 122. Other types of sources of IO operations may be present in a given implementation of system 100.

In selecting particular ones of the paths for delivery of the IO operations to the storage arrays 112A and 112B, the path selection logic 260 of the MPIO driver 250 may implement a path selection algorithm that selects particular ones of the paths in accordance with the path selection algorithm. The MPIO driver 250 may include a user-space portion and a kernel-space portion. The kernel-space portion of the MPIO driver 250 may be configured to detect one or more path changes of the type mentioned above, and to instruct the user-space portion of the MPIO driver 250 to run a path discovery scan responsive to the detected path changes. Other divisions of functionality between the user-space portion and the kernel-space portion of the MPIO driver 250 are possible.

As noted above, in an active-active replication environment data must be identical on each instance of a volume. When a write command, received from a host device (e.g., the host device 122A), is executed on a first instance of a volume (e.g., the first instance 113), the same write request needs to be executed all other instances of the volume (e.g., the second instance 115), as well. However, it is possible that a write will succeed on the first instance and fail on the second instance. A conventional approach for handling this approach is to revert the first instance of the volume to its prior state and issue an error, meaning the host device must retry the write and cannot assume anything about the data that is being written. This approach, however, could lead to a window of vulnerability in which different instances of the same volume store different data at the same address. The window of vulnerability may last until the first instance of the volume is reverted to its prior state.

For example, during the window of vulnerability, a host device may perform the same read twice and receive different data, even though it should have gotten the same data. As another example, during the window of vulnerability, two host devices may each perform a read (from the same address) from different instances of the same volume and receive different data. When the data received is a part of a synchronization object or another similar object that controls the sharing of a resource, receiving different data at the two host devices may result in the two host devices accessing the resource the same time or otherwise sharing the resource incorrectly. While the conventional approach to handling failed writes is acceptable for most type of writes, it can be infeasible for atomic changes such as VMware TM ATS (atomic test and set) or, in general, any read-modify-write command, because global corruption of data can occur during the window of vulnerability.

Figure 3A:
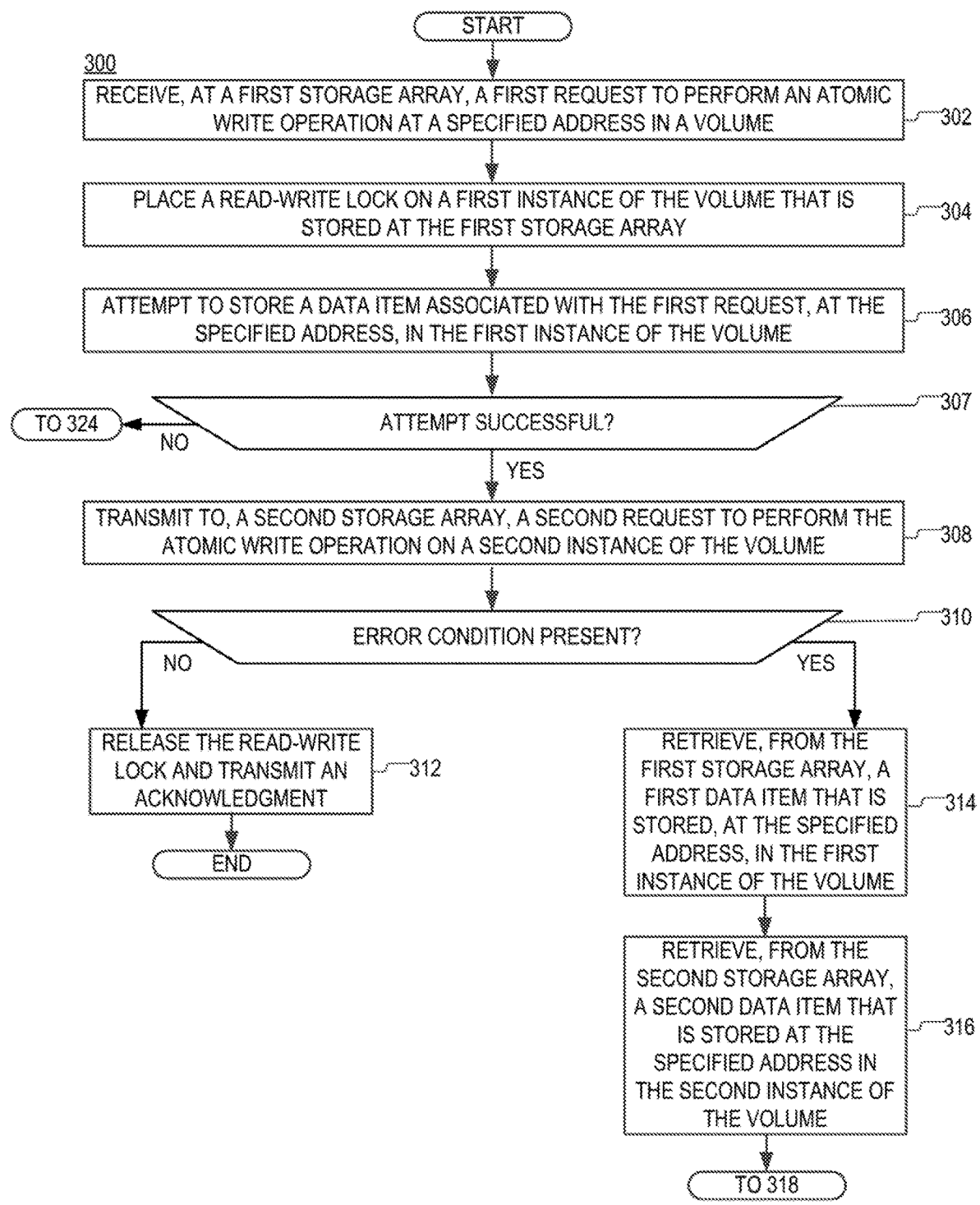
FIG. 3A is a flowchart of an example of a process, according to aspects of the disclosure.
Figure 3B:
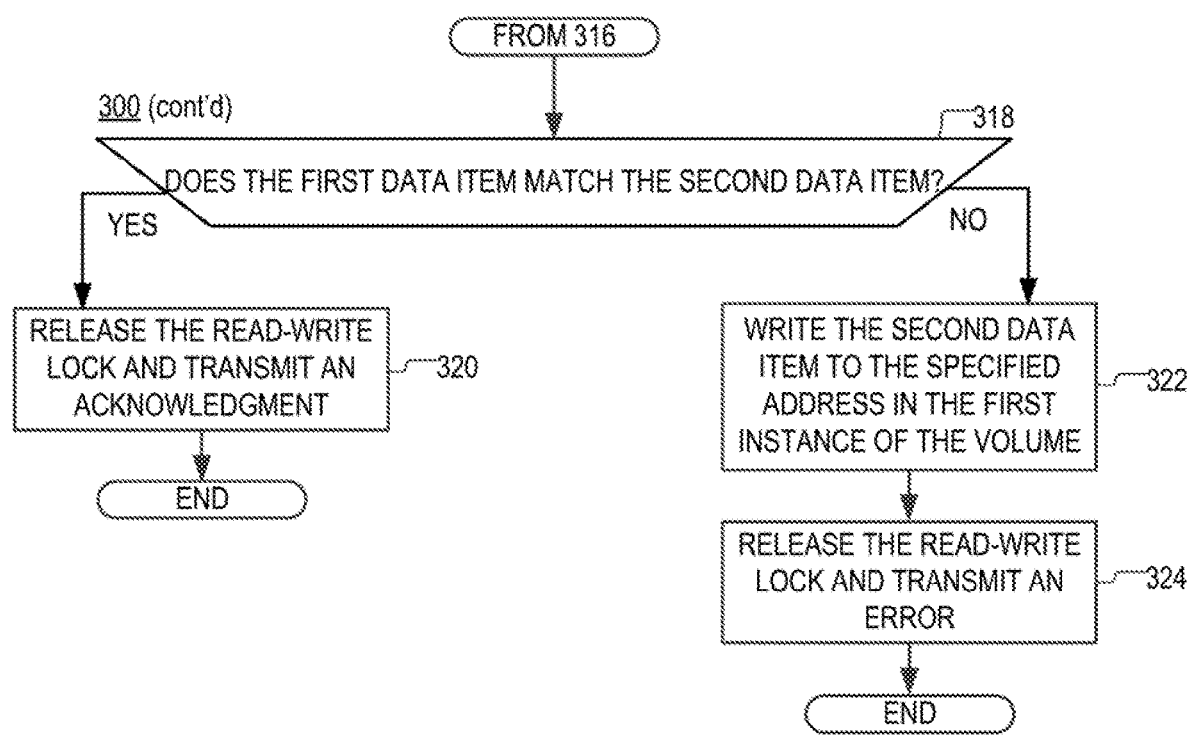
FIG. 3B is a flowchart of an example of a process, according to aspects of the disclosure.

FIGS. 3A-B show a flowchart of an example of a process 300 for executing write commands, according to aspects of the disclosure. According to the present example, the process 300 is performed by the first storage array 112A. Unlike the conventional approach discussed above, the process 300 does not lead to a window of vulnerability in which different host devices can retrieve different data from the same address in the volume 111.

At step 302, the first storage array 112A receives a first request to perform an atomic write operation at a specified address in the volume 111. The first request may be received over the communications network 130 from the host device 122A. The first request may include one or more of an atomic test-and-set (ATS) command, a read-modify-write command, a SCSI reservation command, and/or any other suitable type of atomic write command. The first request may include one or more of (i) an opcode, a (ii) a data item, and (iii) an indication of the specified address where the data item is desired to be stored (e.g., if a condition is satisfied, etc.). The data item may include a page of data and/or any other suitable type of data item.

Although in the example of FIGS. 3A-B the first request includes an opcode, a data item, and an indication of a specified address, alternative implementations are possible in which the data item and/or indication of specified address are provided separately of the opcode. Although in the example of FIG. 3 the first request includes a request to perform an atomic write operation, it will be understood that in some implementations the request may include a request to perform a non-atomic write operation. Stated succinctly, the process 300 is not limited to executing any specific type of write command.

At step 304, the first storage array 112A places a read-write lock on the first instance 113 of the volume 111. The read-write lock may include any suitable type of lock that prevents: (i) the reading of data from the specified address in the first instance 113 of the volume 111, and (ii) the writing of data to the specified address in the first instance 113 of volume 111. In some implementations, the read-write lock may encompass the entire first instance 113 of the volume 111. Additionally or alternatively, in some implementations, the read-write lock may encompass only a portion of the volume 111 that includes the specified address. For example, the read-write lock may be placed on only one of the storage devices 230 that includes the physical location corresponding to the specified address.

At step 306, the first storage array 112A attempts to store the data item associated with the first request in the first instance 113 of the volume 111. The data item may be stored at the address specified by the first request.

At step 307, the first storage array 112A determines if the attempt was successful. If the attempt was not successful, the process 300 proceeds to step 324. Otherwise, if the data item was successfully stored in the first instance 113 of the volume 111, the process 300 proceeds to step 308.

At step 308, the first storage array 112A transmits to the second storage array 112B a second request to perform the atomic write operation on the second instance 115 of the volume 111. The second request may include any suitable type of request to write, in the second instance 115 of volume 111, the data item (associated with the first request), at the address (specified by the first request). The second request may be transmitted over the communications network 116. The second request may be transmitted for the purposes of maintaining the first instance 113 and the second instance 115 of the volume 111 in consistent states.

At step 310, the first storage array 112A detects whether an error condition is present that is associated with the second request. In some implementations, detecting whether an error condition is present may include detecting whether the second request has been completed successfully by the second storage array 112B. If no error condition is detected (i.e., if the second request has been completed successfully by the second storage array 112B), the process 300 proceeds to step 312. Otherwise, if an error condition is detected, the process 300 proceeds to step 314.

At step 312, the first storage array 112A releases the read-write lock (set at step 304), and transmits to the host device 122A an acknowledgment indicating the that the first request has been executed successfully by the storage cluster 110A.

At step 314, the first storage array 112A retrieves a first data item that is stored, at the address specified by the first request, in the first instance 113 of the volume 111. As can be readily appreciated, following a successful execution of step 306, the first data item would be the same as the item associated with the first request (i.e., the atomic write request that is received at the first storage array 112A at step 302).

At step 316, the first storage array 112A retrieves from the second storage array 112B a second data item that is stored, at the address specified by the first request, in the second instance 115 of the volume 111. The second data item may be retrieved by transmitting a read request to the second storage array 112B. As can be readily appreciated, in a situation in which the second storage array 112B has successfully executed the second request, but the first storage array 112A failed to receive an acknowledgment of the successful completion of the second request, the received second data item may be the same as the second data item associated with the first request. This situation can occur as a result of a hiccup or some intermittent failure in the communications network 116 and/or the second storage array 112B. On the other hand, if the second storage array 112B experienced an internal failure that prevented it from completing the second request, the second data item may be different from the data item that is associated with the first request (i.e., the atomic write request that is received at the first storage array 112A at step 302). In either one of these situations, the first storage array 112A would detect the presence of an error condition associated with the second read request (at step 310).

At step 318, the first storage array 112A compares the first data item to the second data item to determine if they match. By way of example, in some implementations, the first data item may match the second data item when they are identical and/or within a predetermined distance from one another. When the first data item is the same as the second data item, this is an indication that: (i) the first instance 113 and the second instance 115 of the volume 111 are in a consistent state, and (ii) the first request has been completed successfully by the storage cluster 110. When the first data item and the second data item are different, this is an indication that: (i) the first instance 113 and the second instance 115 are in inconsistent states (because they store different data at the same address), and (ii) the execution of the first request by the storage cluster 110 has failed. If the first data item matches the second data item, the process 300 proceeds to step 320. Otherwise, if the first data item does not match the second data item, the process 300 proceeds to step 322.

At step 320, the first storage array 112A releases the read-write lock (set at step 304), and transmits to the host device 122A an acknowledgment indicating the that the first request has been executed successfully by the storage cluster 110.

At step 322, the first storage array 112A writes the second data item, at the specified address, to the first instance 113 of the volume 111. Doing so has the effect of bringing back the first instance 113 to a state that is consistent with the state of the second instance 115, effectively restoring the data integrity of the volume 111.

At step 324, the first storage array 112A releases the read-write lock (set at step 304), and transmits to the host device 122A an error indicating the that the first request could not be executed successfully by the storage cluster 110A.

Figure 4:
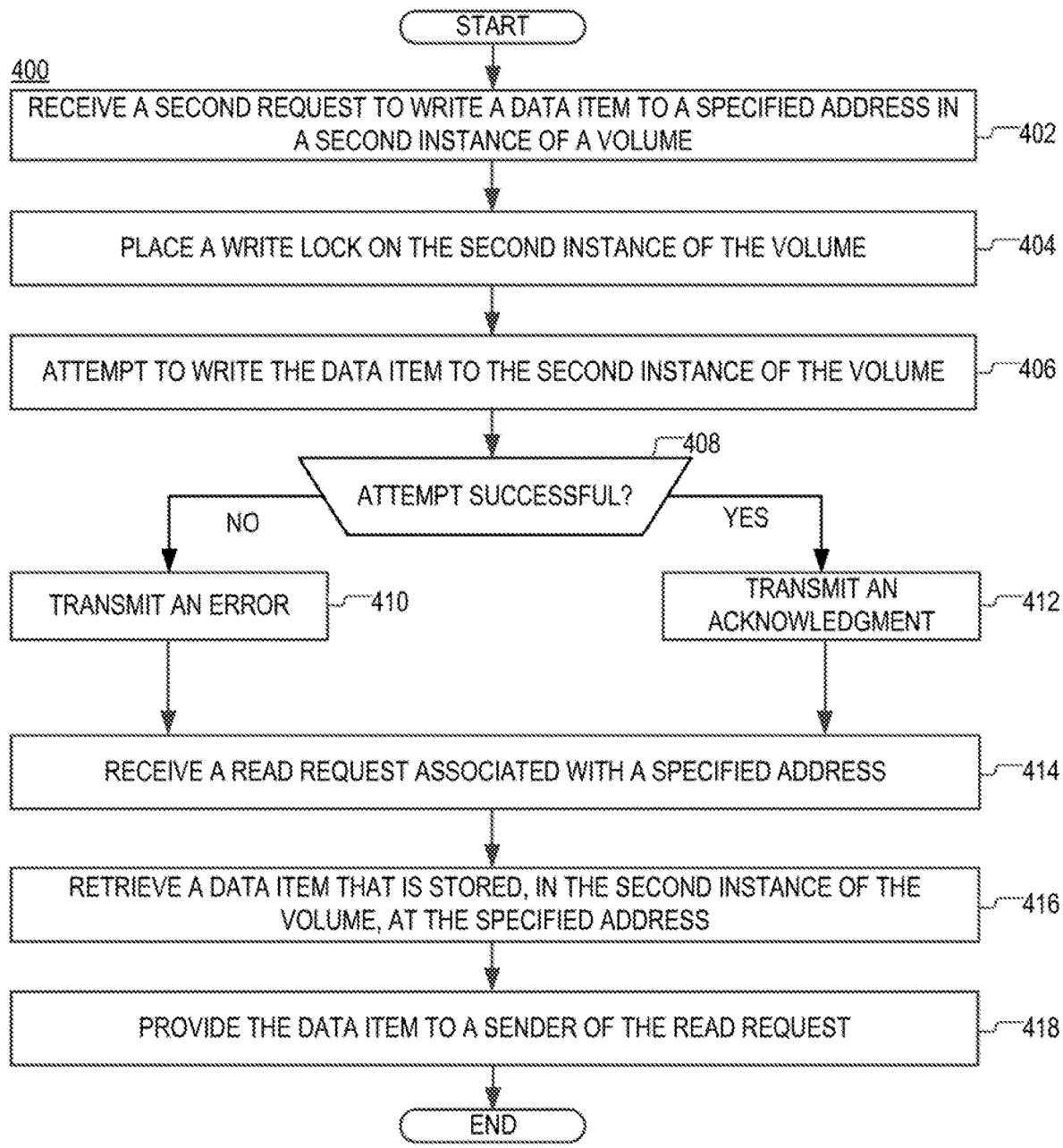
FIG. 4 is a flowchart of an example of a process, according to aspects of the disclosure.

FIG. 4 is a flowchart of an example of a process 400, according to the aspects of the disclosure. According to the example of FIG. 4, the process 400 is performed by the second storage array 112B concurrently with the execution of the process 300 by first storage array 112A. At step 402, the second storage array 112B receives the second request (transmitted at step 308). At step 404, the second storage array 112B places a write lock on the second instance 115 of the volume 11. The write lock may include any suitable type of lock that prevents writing data at the specified address, while permitting reading from the specified address. At step 406, the second storage array 112B attempts to write the data item associated with the second request (and the first request) to the specified address, in the second instance 115 of the volume 111. At step 408, the second storage array 112B determines if the attempt was successful. If the attempt was not successful, at step 410, the second storage array 112B transmits to the first storage array 112A an error indicating that the second request could not be completed. Otherwise, if the attempt was successful, at step 412, the second storage array 112B transmits to the first storage array 112A an acknowledgment indicating that the second request has been completed successfully. At step 414, the second storage array 112B receives from the first storage array 112A a read request associated with the specified address. As noted above, the request may be transmitted at step 316. At step 416, the second storage array 112B retrieves a data item that is stored, at the specified address, in the second instance 115 of the volume 111. At step 418, the second storage array 112B transmits the retrieved data item to the first storage array 112A.

The present disclosure is not limited to any specific method for detecting whether an error condition is present (at step 310 of the process 300). In some implementations, detecting whether an error condition is present may include detecting whether a timeout event is generated that is associated with the second request. The timeout event may include any suitable type of event that indicates that the first array 112A has not received, within a predetermined time period, an acknowledgement that the second request has been completed successfully by the second storage array 112B. Additionally or alternatively, in some implementations, detecting whether an error condition is present may include detecting whether an error is received from the second storage array 112B, which indicates that the second storage array 112B encountered a failure as it was trying to complete the second request. Additionally or alternatively, in some implementations, detecting whether an error condition is present may include detecting whether an acknowledgement is received from the second storage array 112B indicating the second request has been completed successfully.

It should be noted that the read-write lock (set at step 304) is maintained until either an acknowledgment or error is transmitted in response to the first request (received at step 302). Maintaining the read-write lock for the entire duration in which the first request is being serviced prevents the occurrence of a window of vulnerability. Maintaining the read-write lock forces all read requests for the specified address (i.e., the address specified by the first request) to be served by the second instance 115 of the volume 111, thereby preventing the retrieval of different data, from the specified address, from each of the first instance 113 and the second instance 115 of the volume 111. Moreover, under the arrangement described with respect to FIGS. 3A-B, the data stored at the specified address in the second instance 115 of the first volume is guaranteed to be valid. This is in contrast to the first volume, which might temporarily store invalid data before it is reverted to a valid state at step 322. In other words, after the read-write lock is released, the data stored in the specified address in the first instance 115 is guaranteed to be identical to the data in the second instance.

Figure 5:
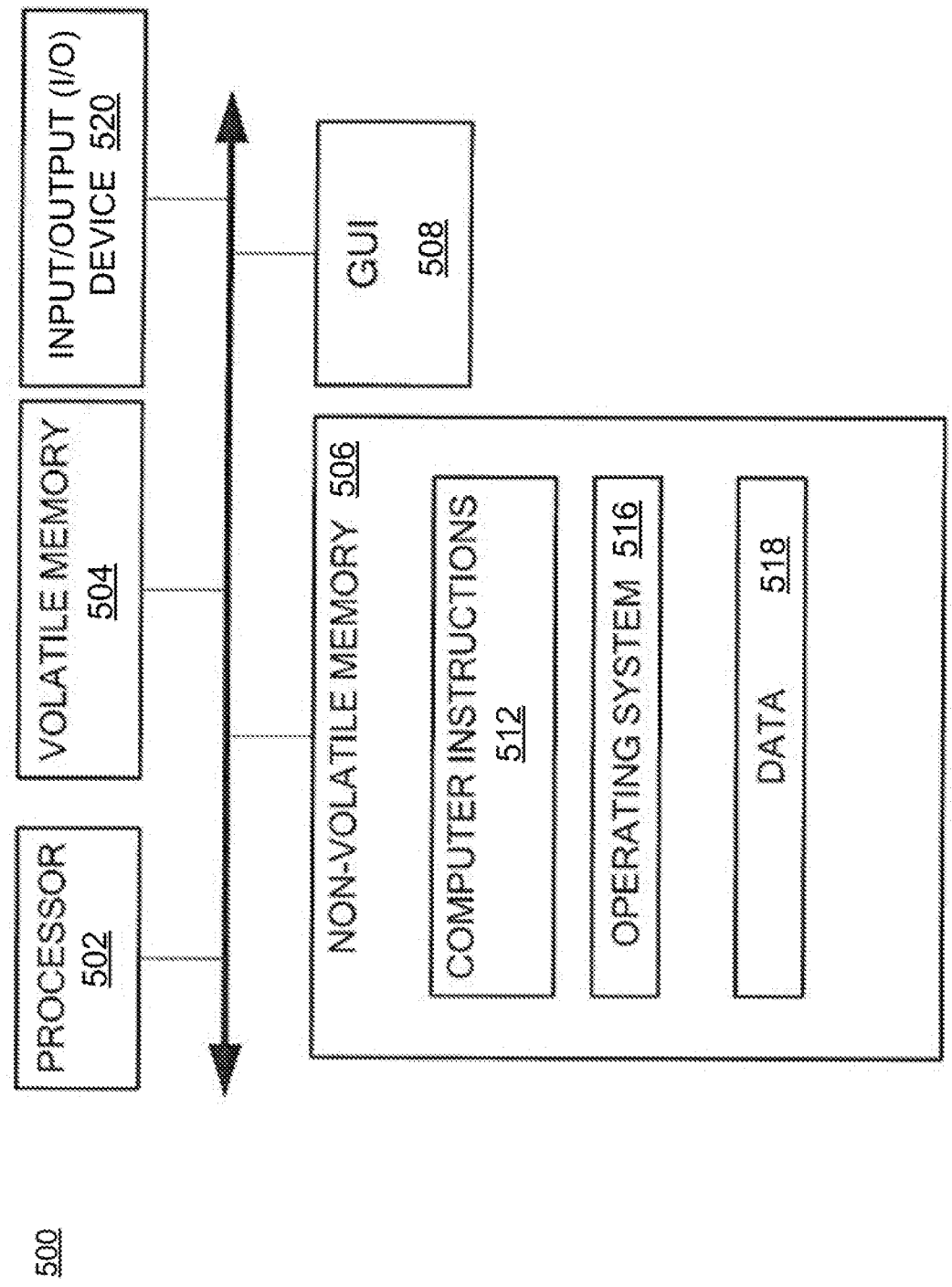
FIG. 5 is a diagram of an example of a computing device, according to aspects of the disclosure.

Referring to FIG. 5, computing device 500 may include processor 502, volatile memory 504 (e.g., RAM), non-volatile memory 506 (e.g., a hard disk drive, a solid-state drive such as a flash drive, a hybrid magnetic and solid-state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504. Program code may be applied to data entered using an input device of GUI 508 or received from I/O device 520.

Processor 502 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

Figure 6A:
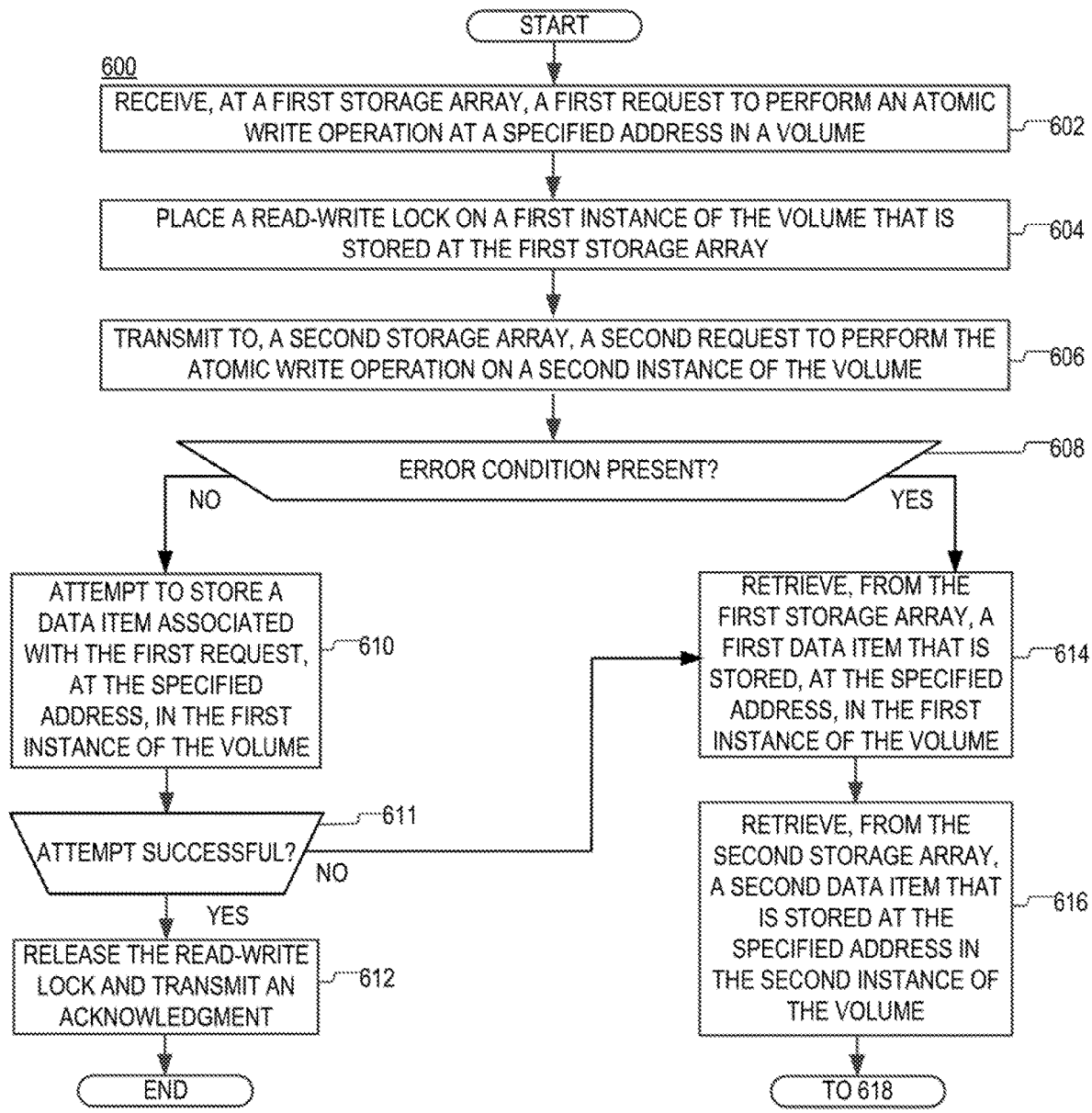
FIG. 6A is a flowchart of an example of a process, according to aspects of the disclosure.
Figure 6B:
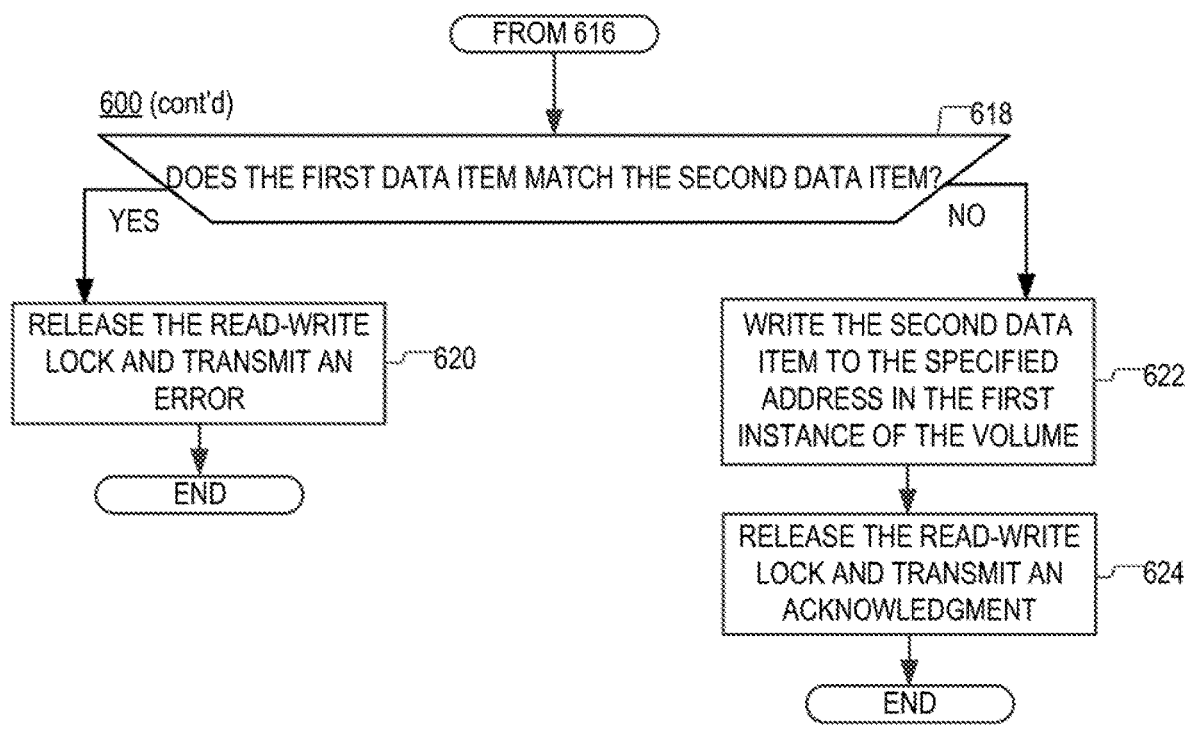
FIG. 6B is a flowchart of an example of a process, according to aspects of the disclosure.

FIGS. 6A-B show a flowchart of an example of a process 600 for executing write commands, according to aspects of the disclosure. According to the present example, the process 600 is performed by the first storage array 112A. Unlike the conventional approach discussed above, the process 600 does not lead to a window of vulnerability in which different host devices can retrieve different data from the same address in the volume 111. In some implementations, the process 600 may be performed concurrently with the process 400, which is discussed above with respect to FIG. 4.

At step 602, the first storage array 112A receives a first request to perform an atomic write operation at a specified address in the volume 111. Step 602 may be performed in the same or similar manner as step 302, which is discussed above with respect to FIGS. 3A-B.

At step 604, the first storage array 112A places a read-write lock on the first instance 113 of the volume 111. Step 604 may be performed in the same or similar manner as step 304, which is discussed above with respect to FIGS. 3A-B.

At step 606, the first storage array 112A transmits to the second storage array 112B a second request to perform the atomic write operation on the second instance 115 of the volume 111. Step 606 may be performed in the same or similar manner as step 308, which is discussed above with respect to FIGS. 3A-B.

At step 608, the first storage array 112A detects whether an error condition is present that is associated with the second request. Step 608 may be performed in the same or similar manner as step 310, which is discussed above with respect to FIGS. 3A-B. If no error condition is detected (i.e., if the second request has been completed successfully by the second storage array 112B), the process 600 proceeds to step 610. Otherwise, if an error condition is detected, the process 600 proceeds to step 614.

At step 610, the first storage array 112A attempts to store the data item associated with the first request in the first instance 113 of the volume 111. The data item may be stored at the address specified by the first request.

At step 611, the first storage array 112A determines if the attempt was successful. If the attempt was not successful, the process 600 proceeds to step 614. Otherwise, if the data item was successfully stored in the first instance 113 of the volume 111, the process 600 proceeds to step 612.

At step 612, the first storage array 112A releases the read-write lock (set at step 604), and transmits to the host device 122A an acknowledgment indicating that the first request has been executed successfully by the storage cluster 110A.

At step 614, the first storage array 112A retrieves a first data item that is stored, at the address specified by the first request, in the first instance 113 of the volume 111. Step 614 may be performed in the same or similar manner as step 314, which is discussed above with respect to FIGS. 3A-B.

At step 616, the first storage array 112A retrieves from the second storage array 112B a second data item that is stored, at the address specified by the first request, in the second instance 115 of the volume 111. Step 616 may be performed in the same or similar manner as step 316, which is discussed above with respect to FIGS. 3A-B.

At step 618, the first storage array 112A compares the first data item to the second data item to determine if they match. Step 618 may be performed in the same or similar manner as step 318, which is discussed above with respect to FIGS. 3A-B. If the first data item matches the second data item, the process 600 proceeds to step 620. Otherwise, if the first data item does not match the second data item, the process 600 proceeds to step 622.

At step 620, the first storage array 112A releases the read-write lock (set at step 604), and transmits to the host device 122A an error indicating the that the first request could not be executed successfully by the storage cluster 110A.

At step 622, the first storage array 112A writes the second data item, at the specified address, in the first instance 113 of the volume 111.

At step 624, the first storage array 112A releases the read-write lock (set at step 304), and transmits to the host device 122A an acknowledgment indicating the that the first request has been executed successfully by the storage cluster 110A.

The example of FIGS. 6A-B assumes that step 622 is executed correctly. If step 622 cannot be executed correctly, the process 600 may return an error in response to the first request and execute another process for bringing the volume instances to a consistent state.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply.

Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

As used throughout the disclosure, the term "storage system" may refer to one or more of: (i) a distributed storage system including a source system and a target system, (ii) the target system, or (iii) the source system.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in an active-active storage cluster having first a storage array and a second storage array, the method comprising:
   receiving, at the first storage array, a first request to perform an atomic write operation at a specified address in a volume, the first request being received from a host device;
   placing a read-write lock on a first instance of the volume that is stored at the first storage array, and executing the atomic write operation on the first instance of the volume;
   transmitting, to the second storage array, a second request to perform the atomic write operation on a second instance of the volume that is stored at the second storage array;
   detecting whether an error condition is present that is associated with the second request; and
   when the error condition is present, comparing a first data item that is stored at the specified address in the first instance of the volume with a second data item that is stored at the specified address in the second instance of the volume, and, when the first data item matches the second data item, transmitting an acknowledgment to the host device indicating that the first request has been completed successfully.

2. The method of claim 1, further comprising, when the error condition is not present, transmitting an acknowledgment to the host device indicating that the first request has been completed successfully.

3. The method of claim 1, when the first data item does not match the second data item, storing the second data item, at the specified address, in the first instance of the volume, and transmitting an error message indicating that the first request could not be completed successfully.

4. The method of claim 1, further comprising releasing the read-write lock after an acknowledgment or an error message is transmitted to the host device.

5. The method of claim 1, wherein the atomic write operation includes a test and set command.

6. The method of claim 1, wherein the atomic write operation includes a read-modify-write request.

7. The method of claim 1, wherein the atomic write request includes a request to change a state of an object that is shared between the host device and at least one other host device that is connected to the active-active storage cluster.

8. A storage system, comprising:
one or more storage devices, and
at least one processor configured to perform the operations of:
receiving a first request to perform an atomic write operation at a specified address in a volume, the first request being received from a host device;
placing a read-write lock on a first instance of the volume that is stored in the one or more storage devices, and executing the atomic write operation on the first instance of the volume;
transmitting, to a peer storage system, a second request to perform the atomic write operation on a second instance of the volume that is stored at the peer storage system;
detecting whether an error condition is present that is associated with the second request; and
when the error condition is present, comparing a first data item that is stored at the specified address in the first instance of the volume with a second data item that is stored at the specified address in the second instance of the volume, and, when the first data item matches the second data item, transmitting an acknowledgment to the host device indicating that the first request has been completed successfully.

9. The storage system of claim 8, wherein the at least one processor is further configured to perform the operation of, when the error condition is not present, transmitting an acknowledgment to the host device indicating that the first request has been completed successfully.

10. The storage system of claim 8, wherein the at least one processor is further configured to perform the operation of, when the first data item does not match the second data item, storing the second data item, at the specified address, in the first instance of the volume, and transmitting an error message indicating that the first request could not be completed successfully.

11. The storage system of claim 8, wherein the at least one processor is further configured to perform the operation of releasing the read-write lock after an acknowledgment or an error message is transmitted to the host device.

12. The storage system of claim 8, wherein the atomic write operation includes a test and set command.

13. The storage system of claim 8, wherein the atomic write operation includes a read-modify-write request.

14. The storage system of claim 8, wherein storage system and the peer storage system are part of an active-active storage cluster, and the atomic write request includes a request to change a state of an object that is shared between the host device and at least one other host device that is connected to the active-active storage cluster.

15. A method for use in an active-active storage cluster having first a storage array and a second storage array, the method comprising:
receiving, at the first storage array, a first request to perform an atomic write operation at a specified address in a volume, the first request being received from a host device;
placing a read-write lock on a first instance of the volume that is stored at the first storage array;
transmitting, to the second storage array, a second request to perform the atomic write operation on a second instance of the volume that is stored at the second storage array; and
detecting whether an error condition is present that is associated with the second request;
when the error condition is present, comparing a first data item that is stored at the specified address in the first instance of the volume with a second data item that is stored at the specified address in the second instance of the volume, and, when the first data item does not match the second data item, copying the second data item to the specified address in the first instance of the volume, and transmitting an acknowledgment to the host device indicating that the first request has been completed successfully.

16. The method of claim 15, further comprising, when no error condition is present, executing the atomic write operation on the first instance of the volume and transmitting an acknowledgment to the host device indicating that the first request has been completed successfully.

17. The method of claim 15, when the first data item matches the second data item, transmitting an error message indicating that the first request could not be completed successfully.

18. The method of claim 15, releasing the read-write lock after an acknowledgment or an error message is transmitted to the host device.

19. The method of claim 15, wherein the atomic write operation includes a test and set command.

20. The method of claim 15, wherein the atomic write operation includes a read-modify-write request.

* * * * *